R. J. LACKNER.
SPRING TIRE.
APPLICATION FILED DEC. 16, 1908.

947,826.

Patented Feb. 1, 1910.

Inventor
R. J. Lackner.

UNITED STATES PATENT OFFICE.

RUDOLPH J. LACKNER, OF NEW YORK, N. Y.

SPRING-TIRE.

947,826. Specification of Letters Patent. Patented Feb. 1, 1910.

Application filed December 16, 1908. Serial No. 467,851.

*To all whom it may concern:*

Be it known that I, RUDOLPH J. LACKNER, subject of the Emperor of Austria-Hungary, residing in New York, in the county of New York and State of New York, have invented certain new and useful Improvements in Spring-Tires, of which the following is a specification.

This invention comprehends certain new and useful improvements in wheels of that type designed particularly for use on automobiles or other vehicles, and the invention has for its object a simple, durable and efficient construction of device of this character which has a maximum resiliency and is susceptible of withstanding hard usage, while at the same time being free from the liability of punctures or blow-outs that have been found so objectionable with the ordinary pneumatic tires in general use. And a further object of the invention is an improved resilient tire which is composed of a plurality of substantially duplicate sections, any one of which may be quickly detached, without disturbing the others, when it is necessary to replace such section by a new one. With such arrangement, it will be apparent that when traveling in a vehicle equipped with these improved tires, it will be necessary to carry only one or two of the tire sections, which is obviously more convenient than taking a complete new tire, as is the usual custom.

With these and other objects in view that will more fully appear as the description proceeds, the invention consists in certain constructions and arrangements of the parts that I shall hereinafter fully describe, and then point out the novel features thereof in the appended claims.

Figure 1:
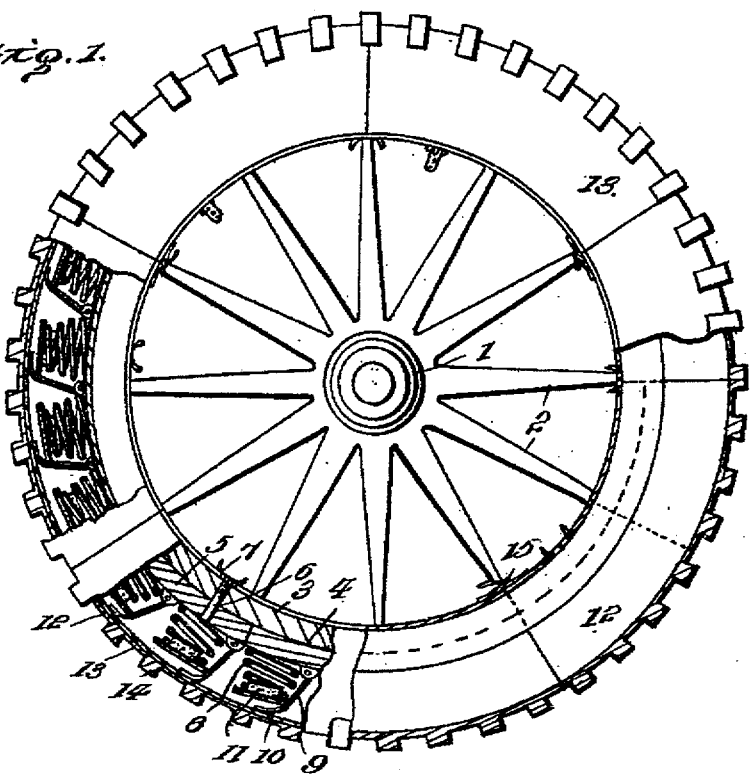
Figure 2:
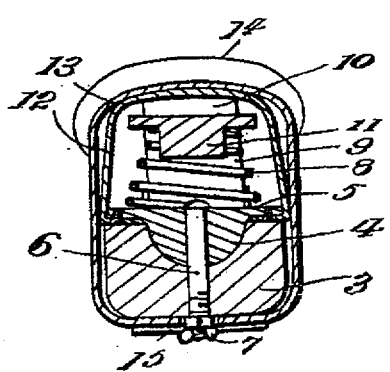
Figure 3:
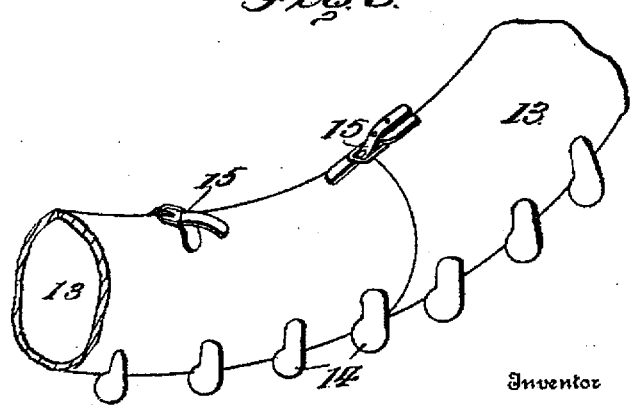

For a full understanding of the invention and the merits thereof, and to acquire a knowledge of the details of construction, reference is to be had to the following description and accompanying drawings, in which:

Figure 1 is a side elevation, the parts being in section, of a resilient wheel constructed in accordance with my invention; Fig. 2 is a transverse section thereof; and, Fig. 3 is a detail perspective view of two adjacent sections of the rubber tread.

Corresponding and like parts are referred to in the following description and indicated in all the views of the drawing by the same reference characters.

My improved tire is designed to be applied to a wheel which embodies a hub 1, spokes 2, and a felly 3, all of which may be of any desired or approved construction or design, excepting the felly, which is preferably formed in its periphery with an annular channel 4.

The tire consists essentially of a plurality of substantially duplicate rim sections 5 in the form of segmental plates that may be of any suitable number, preferably six, and that are applied to the periphery of the felly 3 with their ends having butt joints, so as to entirely encircle the same. The inner surfaces of these rim sections are suitably formed to fit into the channel 4, and are detachably retained in position therein and connected to the felly by any suitable means, as for instance, by a plurality of attaching bolts 6. These bolts pass through the respective sections and through openings provided in the felly and project inwardly beyond the latter with flange nuts 7 working thereupon.

Rigidly mounted upon the periphery of each of the rim sections 5 are a plurality of longitudinally spaced helical expansion springs 8 which extend substantially radially outwardly from the wheel and which are considerably strong, although they are susceptible of yielding inwardly under compression. When all of the rim sections are in place, it will be seen by referring particularly to Fig. 1, that the wheel is thus encircled by a series of outstanding springs which are arranged to bear the load successively, as the wheel revolves.

Interposed between the helical springs 8 are substantially flat tongues 9 which are hingedly connected at one end to the corresponding rim sections 5 and which pass outwardly between the adjacent springs and have their extremities rearwardly and angularly disposed, as indicated at 10, so as to extend partially over the next spring in the rear of the respective tongues. Preferably solid rubber caps 11 are fitted in the outer ends of the helical springs and are arranged to have the angularly disposed ends 10 bear thereagainst as the tongues 9 are moved inwardly under pressure. The series of springs 8 are incased by a covering 12 of leather or the like, the side portions of which are relatively thin so as not to interfere with the action of the springs, and the edges of which are lapped inwardly around the respective rim sections 5 and are detachably connected thereto by screws or other suitable fastening means. For convenience, I have made this leather covering 12 in a plurality of sections, one for each rim section, but it is to be understood that I do not limit myself to any such arrangement.

The tire is completed by a rubber tread 13 which substantially surrounds the leather covering 12 and which is formed in its outer surface with a series of spaced transverse bars 14 in order to increase the adhesive engagement with the supporting surface and prevent any possibility of the wheel slipping thereon. In the present instance, this tread 13 is composed of a number of sections equal to the number of rim sections 5, and the various sections of the tread are provided at their meeting edges with buckles 15 through the instrumentality of which the sections are buckled around the felly 3 as well as the leather covering 12, the ends of the adjacent tread sections being also buckled together to prevent one section from moving relative to the others.

In the practical use of my improved resilient wheel, when the same revolves forwardly during the progress of the vehicle, it will be seen that the angularly disposed ends 10 of the tongues 9 will be pressed inwardly successively, as they assume a position to sustain the load. When the tongues move inwardly under pressure, they admit of the compression of the corresponding expansion springs 8 but inasmuch as the tongues are the first to be subjected to the weight or pressure, and are moved or pressed inwardly against the rubber caps 11, it will be observed that the pressure of the load is evenly distributed throughout their respective springs, which thus materially increases their length of life. As soon as the springs are relieved of pressure, and expand to their normal positions, the tongues will be moved outwardly, as will be manifest. In the event of one of the expansion springs 4 losing its resiliency, it will be comparatively easy to locate such trouble, and it is but the matter of a short while for the driver of the vehicle to remove the tread section surrounding the rim section that carries the broken spring. The flange nuts 7 are then removed from the corresponding attaching bolts 6 and this rim section 5 is removed from the felly 3 of the wheel and may be quickly replaced by a new one without the necessity of disturbing the other parts of the wheel. The damaged section is returned to the manufacturer, and it will be manifest that it may be repaired by him at comparatively small cost.

From the foregoing description, in connection with the accompanying drawing, it will be apparent that I have provided an improved resilient wheel that consists essentially of a novel tire which is adapted to withstand the hard usage to which it is subjected on an automobile or similar "speed" vehicle, and is not liable to puncture or the like; which is composed of a plurality of sections that may be readily detached in case of damage, and that are so arranged that the damage may be quickly located; which is simple, durable and efficient in construction and operation, and which consists of comparatively few parts that may be easily and cheaply manufactured and readily assembled.

Having thus described the invention, what I claim is:

1. In a wheel, the combination with the felly thereof, of a series of outstanding springs mounted on the periphery of the felly and provided at their outer ends with rubber caps, and spring tongues carried by the felly and bearing against the respective caps.

2. In a wheel, the combination with the felly thereof, of a circumferential series of spiral springs mounted upon the felly and projecting substantially radially outwardly therefrom, caps fitted to the outer ends of the springs, and tongues interposed between the springs and hingedly connected at one end to the felly, the other ends of the tongues being angularly disposed and extending outside of the respective caps and adapted to press inwardly thereagainst, as and for the purpose specified.

In testimony whereof I affix my signature in presence of two witnesses.

RUDOLPH J. LACKNER. [L. S.]

Witnesses:
PAUL KAUTZ,
FRED. DUERR.